United States Patent [19]

Yamada et al.

[11] Patent Number: 4,875,091
[45] Date of Patent: Oct. 17, 1989

[54] FIELD SEQUENTIAL COLOR IMAGING APPARATUS

[75] Inventors: Hidetoshi Yamada, Tokyo; Tatsuo Nagasaki, Yokohama, both of Japan

[73] Assignee: Olympus Optical Co., Ltd., Tokyo, Japan

[21] Appl. No.: 168,796

[22] Filed: Mar. 16, 1988

[30] Foreign Application Priority Data

Mar. 17, 1987 [JP] Japan ................................ 62-61684

[51] Int. Cl.⁴ .................. H04N 9/04; H04N 7/18; H04N 9/67
[52] U.S. Cl. ........................ 358/42; 358/30; 358/41; 358/98
[58] Field of Search ............. 358/29 C, 41, 42, 43, 358/44, 48, 55, 75, 30, 98

[56] References Cited

U.S. PATENT DOCUMENTS

| | | | |
|---|---|---|---|
| 3,985,449 | 10/1976 | Patrin | 358/41 |
| 4,253,447 | 3/1981 | Moore et al. | 358/98 |
| 4,404,585 | 9/1983 | Hjortzberg | 358/42 |
| 4,682,212 | 7/1987 | Inuiya et al. | 358/41 |
| 4,713,683 | 12/1987 | Fujimori et al. | 358/42 |

Primary Examiner—James J. Groody
Assistant Examiner—Randall S. Svihla
Attorney, Agent, or Firm—Armstrong, Nikaido, Marmelstein, Kubovcik & Murray

[57] ABSTRACT

An object which is sequentially illuminated by light having wavelengths different for each of several fields is imaged using an X-Y addressed solid state imaging device. The photoelectrically converted signals are read out from the solid state imaging device by the application of drive signals, the read-out being performed without providing a period during which light illumination is suspended. The color mixture caused in accordance with the read-out timing is corrected by using weighting coefficients so as to produce predetermined color video signals.

12 Claims, 6 Drawing Sheets

FIELD SEQUENTIAL COLOR IMAGING APPARATUS

BACKGROUND OF THE INVENTION

1. Field of the Invention

The present invention relates to a field sequential color imaging apparatus which uses an X-Y addressed solid state imaging device.

2. Description of the Prior Art

In order to obtain a color picture by an endoscope which uses a solid state imaging device, it is known to switch over the light from a light source to different primary colors for each of several fields, and to reproduce a color image by primary color signals transmitted in succession in a field sequential manner. This field sequential color imaging system has an advantage in that it produces an image of a high resolution with fewer picture elements, when compared with a system which employs an imaging device with a color filter array provided on the device.

U.S. Pat. No. 4,253,447 discloses an endoscope which employs a field sequential color system of the above-described type.

In this endoscope, an object is illuminated by lights of different red, green and blue wavelengths, and the signals obtained by a charge-coupled device under the individual lights are transmitted at times during which the light illumination is suspended and are stored in frame memories.

However, if a solid state imaging device which is of an X-Y addressed type such as a MOS type or a charge modulation device which is described from page 353 to 356 of IEDM Digest of Technical Papers issued in 1987 is used, special attention must be paid in illuminating the light from the light source. More specifically, in either of the above-described devices, the exposure of individual picture elements starts at the time at which they are scanned, so that the exposure period is different for each picture element. Therefore, if the imaging screen is continuously scanned while the primary colors are switched over for each field, the primary color signals which represent individual picture elements are mixed at a different ratio for each picture element to form a signal representing each picture element. In order to obtain a single primary color signal for each of the picture elements in each field, the scanning must be suspended while each primary color is illuminated, the image being scanned so that its signals are read during the suspension of light illumination. In other words, it is necessary to provide a period during which light illumination is suspended for each field, as in the endoscope disclosed in U.S. Pat. No. 4,253,447.

The above-described system, however, suffers from problems involving an inefficient use of light and a lowered sensitivity. More specifically, provision of the period during which the light illumination is suspended reduces the intensity of light which is illuminated, thereby reducing the sensitivity. In particular, when the number of picture elements is increased so as to reproduce an image of a higher resolution, the period during which the signals are read must be made correspondingly longer, further reducing the sensitivity. Deterioration of the sensitivity may be prevented by increasing the period of one field. However, this increases the degree of color shift which occurs when the object moves, and makes reproduction of a good quality image impossible. The period during which the light illumination is suspended may be shortened by increasing the signal read-out frequency of the device. However, there is a limitation to this in terms of the operation of the device.

SUMMARY OF THE INVENTION

Accordingly, an object of the present invention is to provide a field sequential color imaging apparatus which does not need a period during which light illumination is suspended.

Another object of the present invention is to provide a field sequential color imaging apparatus which ensures a highly efficient use of light as well as an increased sensitivity.

Still another object of the present invention is to provide a field sequential color imaging apparatus which does not cause a reduction in imaging sensitivity, even when the number of picture elements of a solid state imaging device is increased.

In the present invention, when an object which is successively illuminated by lights of different wavelengths is to be imaged by an X-Y addressed type solid state imaging device, read-out of picture elements in each field is performed without providing a period during which light illumination is suspended, and the color mixture caused in accordance with the read-out timing is corrected by using weighting coefficients corresponding to the read-out timing so as to generate a predetermined color signal and thereby provide a color imaging means which ensures a highly efficient use of light and a high sensitivity.

DETAILED DESCRIPTION OF THE PREFERRED EMBODIMENTS

Figure 1:
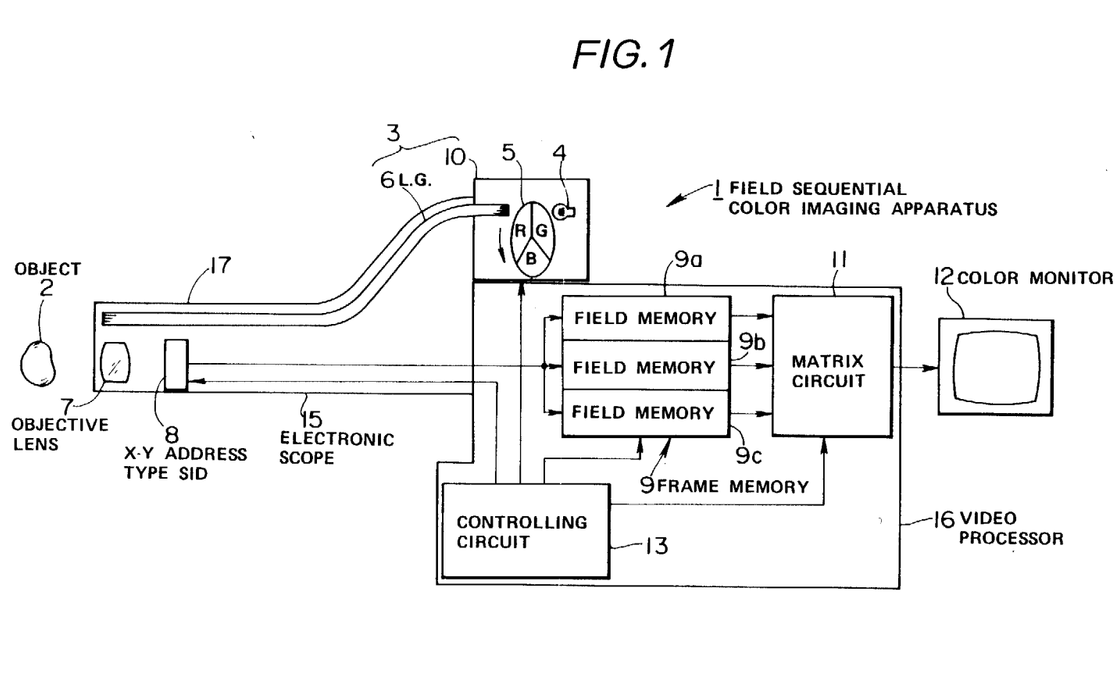
FIG. 1 illustrates a basic structure of a first embodiment of the present invention.

A first embodiment of the present invention will be described below with reference to FIGS. 1 to 4. Referring first to FIG. 1, a field sequential color imaging apparatus 1 includes a field sequential type light source device 10 which generates light illumination in a field sequential manner; an electronic scope 15 for transmitting the light from the light source device 10 and illuminating it toward an object 2, as well as for imaging the illuminated object 2; a video processor 16 for processing signals which have been photoelectrically converted by an X-Y addressed solid state imaging device 8 incorporated in the electronic scope 15, so as to generate predetermined picture signals; and a color monitor 12 for displaying an image of the object obtained from the predetermined picture signals delivered from the video processor 16.

The object 2 is illuminated by a illumination system 3 which illuminates one of the primary color lights for each field. More specifically, the white light of a lamp 4 is passed through fan-shaped R, G, and B color filters which are disposed in circular direction and form a rotary filter 5 so as to generate R, G, and B primary color lights, and these primary color lights are transmitted through a light guide 6 and are irradiated from the end of the light guide 6 so as to illuminate the object 2 in a field sequential manner.

The object 2 illuminated in the field sequential manner is imaged through an objective lens 7 on the imaging screen of the X-Y addressed type solid state imaging device 8, and photoelectrically converted signals which are output from the X-Y addressed solid state imaging device 8 are stored in a frame memory 9 which is comprised of three field memories 9a, 9b, and 9c which are switched over for each field. Signals which are read from the frame memory 9 are input to a matrix circuit 11 which multiplies the signals by coefficients which are determined by the read-out timing of the solid state imaging device 8, then adds the results so as to generate respective single primary color signals. The primary color signals are then used to display the image of the object 2 in color on the color monitor 12.

The field sequential color imaging apparatus 1 also includes a control circuit 12 which controls the timing at which the illumination system 3, the solid state imaging device 8, the frame memory 9, and the matrix circuit 11 are operated.

In this field sequential color imaging apparatus 1, since no period during which light illumination is suspended is provided, the signals read out from the X-Y addressed solid state imaging device 8 correspond to those obtained when the object is illuminated not only by single primary color lights but by pluralities of primary color lights, i.e., mixtures of a plurality of primary color signals. However, in this case, they are separated into single primary color signals by the matrix circuit 11. Therefore, the level of the signal is higher than that in the case in which the period during which the light illumination is suspended is provided, and a highly sensitive, vivid color picture is thus obtained.

Figure 2:
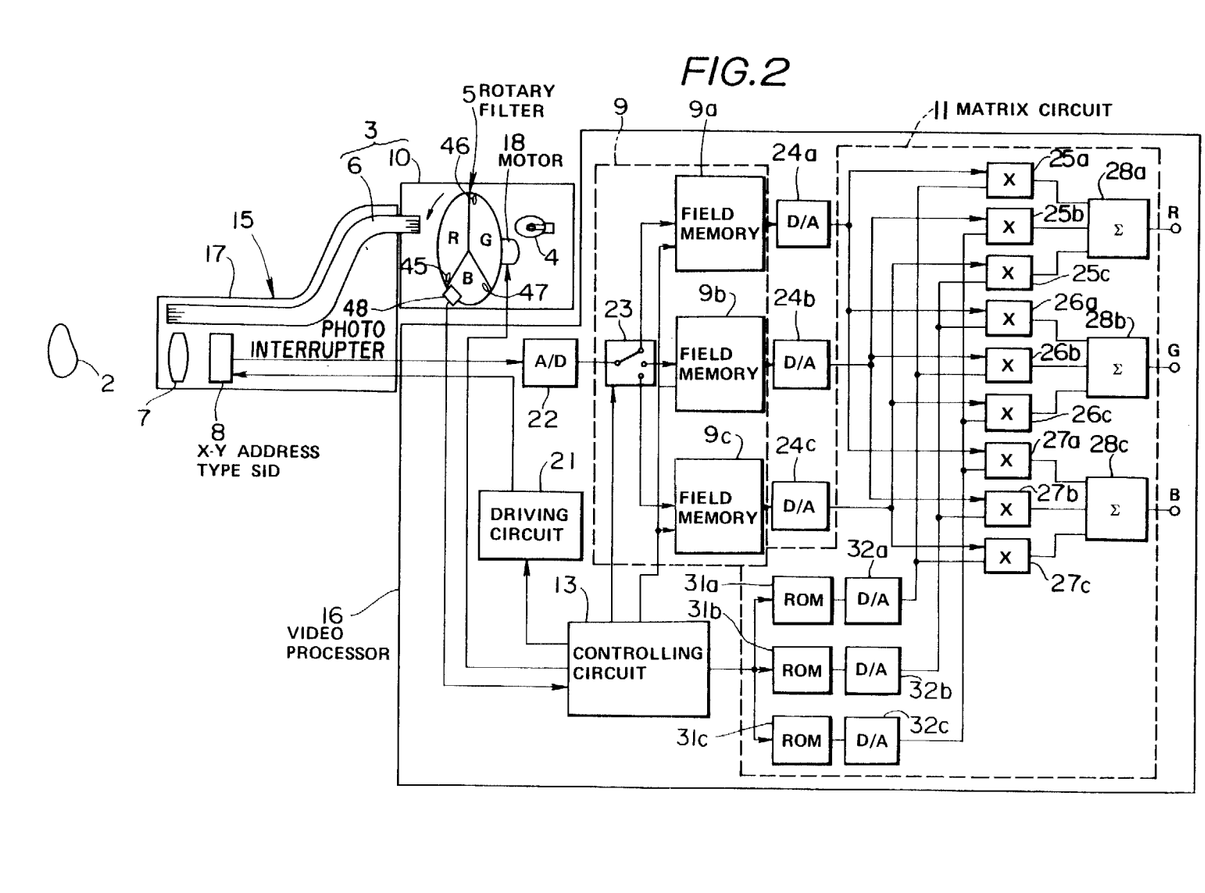
FIG. 2 illustrates an actual structure of the first embodiment of the present invention.

The first embodiment in a practical form will be described below with reference to FIGS. 2 to 4.

In the field sequential color imaging apparatus 1, the object 2 is illuminated in a field sequential manner by the three primary color lights, one for each field, irradiated from the end of the light guide 6 constituting the illumination system 3. The illuminated object 2 is then imaged on the imaging screen of the X-Y addressed solid state imaging device 8 through the objective lens 7.

The light guide 6 is provided within the electronic scope 15. The electronic scope 15 has an elongated insertion portion 17 which can be easily inserted into a body cavity. The forward end of the insertion portion 17 is provided with the objective lens 7 and the X-Y addressed solid state imaging device 8 which together constitute a field sequential system color imaging means.

The illumination system 3 is composed of the lamp 4 for generating the white light, the rotary filter 5 which is provided in the optical path of the white light from the lamp 4 and is driven by a motor 18, and the light guide 6 into which the R, G, and B primary color lights which have passed through R, G, and B color transmitting filters which form the rotary filter are incident and from the end of which these lights are irradiated.

Figure 3A:
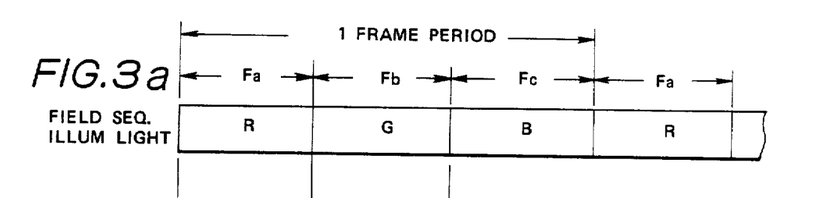
FIG. 3a-3b illustrate the operation of the first embodiment of the present invention.

The light irradiated toward the object 2 from the end of the light guide 6 is changed into a red illumination R, a green illumination G, and a blue illumination B for each of corresponding fields Fa, Fb, and Fc which have the same period, as shown in FIG. 3a. In this case, each of the primary color lights suddenly changes to a subsequent primary color light in a state wherein a period during which the illumination is suspended is maintained at zero. Therefore, the intensity of the illuminated light is larger than that of the case in which the period during which the illumination is suspended is provided.

The optical image formed in the X-Y addressed solid state imaging device 8 is photoelectrically converted by the device 8, and the thus-converted signals are read out through a signal cable by a drive signal output from a drive circuit 21 incorporated within the video processor 16 to an A/D converter 22 at which they are converted into digital signals. The signals are then sequentially written into the field memories 9a, 9b, and 9c through a change-over switch 23 which is switched over for the period of one field of illumination by the control unit 13.

The field memories 9a, 9b, and 9c that form the frame memory 9 are each composed of, for example, a pair of field memories, so that writing and reading can be simultaneously performed by performing writing and reading alternately.

The signal data stored in the field memories 9a, 9b, and 9c are respectively and simultaneously read out to D/A converters 24a, 24b, and 24c at which they are converted into analog signals, then are input to the matrix circuit 11.

The matrix circuit 11 includes nine multipliers 25a, 26a, 27a; 25b, 26b, 27b; 25c, 26c, 27c into which the output signals from the D/A converters 24a; 24b; 24c are input, three adders 28a, 28b, 28c into which the outputs of the three multipliers 25a, 25b, 25c; 26a, 26b, 26c; 27a, 27b, 27c (these are represented by 25, 26 and 27) are respectively fetched and the fetched data are added so as to produce R, G, and B color signals, respectively, ROMs 31a, 31b, 31c which contain weighting coefficients; and D/A converters 32a, 32b, 32c for D/A converting the outputs of the ROMs 31, 31b, 31c and then applying them to the other input terminal of the multipliers 25, 26, 27.

Figure 4:
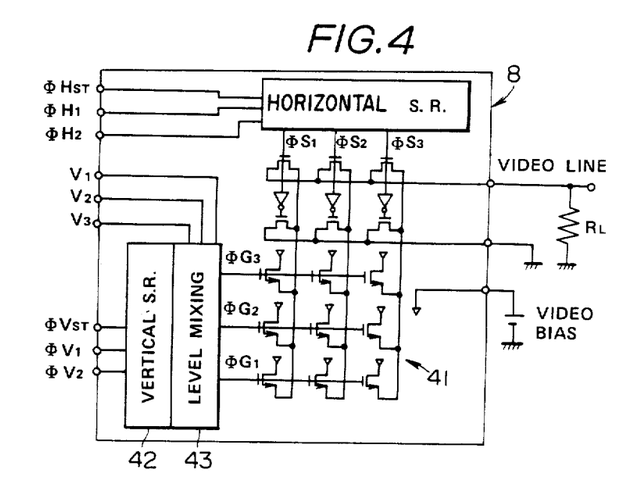
FIG. 4 illustrates the structure of one example of an X-Y addressed solid state imaging device employed in the first embodiment of the present invention.

A charge modulation device such as that shown in FIG. 4 may be employed as the X-Y addressed solid state imaging device 8 of this embodiment. The charge modulation device has an imaging portion 41 which is composed of photoelectrically converting elements which form matrix-arranged picture elements (1 Tr/cell), and vertical and horizontal scanning circuits made of MOS transistors. A level mixing circuit 43 which receives the output from a vertical shift register 42 retains a signal on a non-selected gate selection line at a level at which the current in the charge modulation device is cut off, and generates a signal on a selected gate selection line which has a level at which the source current flows in accordance with the amount of light which is incident.

The selected gate selection line accumulates electrons at a portion of the charge modulation device which is located immediately under that gate line in a horizontal retrace line interval immediately after the selection and resets the inversion layer charge. The horizontal scanning circuit sequentially turns on the corresponding horizontal selecting MOS switches at the timing of clock pulse. Therefore, in the picture elements connected to the gate selection line selected by the vertical scanning circuit, the source current of the picture element selected by the horizontal scanning circuit flows through a video line to a load resistance ($R_L$) and is output as variation in the voltage.

A commonly used MOS type X-Y addressed solid state imaging device may also be employed as the X-Y addressed solid state imaging device 8.

The time at which each field starts may be detected by the provision of three small holes 45, 46, and 47 provided on the periphery of the rotary filter 5 as well as a rotational position detecting means such as a photo interrupter 48 composed of a light-emitting diode and a photo diode, the light-emitting diode and the photo diode being disposed on the two sides of the rotary filter 5 at one location of the periphery thereof. The photo diode receives light from the light-emitting diode through the small holes 45, 46, and 47, respectively, as the R, G, B color transmitting filters are interposed in the optical path, and thereby detects the starting of each filter. The output signal from the photo diode which constitutes the position detecting means is input to the control circuit 13 wherein it is used by the control circuit 13 to control the timing of generation of the driving signal output from the driving circuit 21 as well as other circuits. A motor servo circuit (not shown) controls the motor 18 for rotating the rotary filter 5 in such a manner that its rotational speed becomes constant. In this case, the rotation of the motor 18 is phase controlled such that it rotates in synchronism with the reference clock within the control circuit 13.

A timing at which the X-Y addressed solid state imaging device 8 reads out signals will be described below with reference to FIG. 3.

Figure 3B:
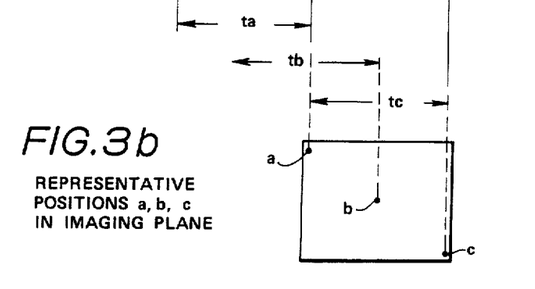

One frame period shown in FIG. 3 consists of three fields Fa, Fb, and Fc whose periods are equal in the first embodiment. The fields Fa, Fb, and Fc each represent a period in which red, green, or blue light R, G, B is illuminated. The object is illuminated by these lights in succession.

Regarding the read-out of signals from the solid state imaging device 8, scanning of the imaging screen begins at the time at which each field starts, and is completed at the time at which the field is ended. If the number of picture elements is small, scanning of the picture elements in one screen may be completed before that field is ended. Alternatively, scanning may be started a predetermined time after the field has started, the scanning being completed at the time at which the field is ended.

When the field Fb is to be scanned, for example, a picture element a on the solid state imaging device which is scanned at the beginning of the field is exposed to the light during a field period indicated by ta, as shown in FIG. 3a. Similarly, a picture element b scanned at the mid point of the field is exposed to light during a period tb, and a picture element c scanned at the end of the field is exposed to light during a period tc.

Therefore, the color components of the light which the picture element a receives are almost R, those of the light for the picture element b are about ½ R and ½ G, and those for the picture element c are almost G. The primary color components of the light that the picture element which is scanned t time after the field has started receives are expressed by the following equations:

$$\text{Field } Fa : SR + (1 - S)B \\ \text{Field } Fb : SG + (1 - S)R \\ \text{Field } Fa : SB + (1 - S)G \quad \} \quad (1)$$

where $S = t/tF$, and tF represents one field period.

The R, G, B primary color components are obtained from the above-described equations (1) as follows:

$$\begin{aligned} R &= \frac{S^2}{3S^2 - 3S + 1} F_1 + \frac{(S-1)^2}{3S^2 - 3S + 1} F_2 + \frac{(S-1)S}{3S^2 - 3S + 1} F_3 \\ G &= \frac{S(S-1)}{3S^2 - 3S + 1} F_1 + \frac{S^2}{3S^2 - 3S + 1} F_2 + \frac{(S-1)^2}{3S^2 - 3S + 1} F_3 \\ B &= \frac{(S-1)^2}{3S^2 - 3S + 1} F_1 + \frac{(S-1)S}{3S^2 - 3S + 1} F_2 + \frac{S^2}{3S^2 - 3S + 1} F_3 \end{aligned} \quad (2)$$

where $F_1$, $F_2$, and $F_3$ are signal outputs obtained in the fields Fa, Fb, and Fc, respectively. Primary color signals having no color mixture can be obtained if calculations are performed on the output in each field using the equations (2). A variable S may vary for each picture element or for each horizontal line. In the latter case, non-uniformity of signals occurs at a ratio of one field period to one horizontal line period, but it is not a problem in a practical operation. In the above-described equations, the variable S varies in a range between 0 and 1. However, it is convenient in terms of construction of the circuit, if it is an integer. So, S is converted to n/m when it is used in the equations (2), where n is an integer which varies as 1, 2, 3, . . . m, and m is the total number of picture elements in one field or the total number of horizontal lines.

The operation of the embodiment shown in FIG. 2 which is based on the above-described principle will be described below. The video signals which are output from the solid state imaging device 8 are amplified in a suitable manner by an amplifier (not shown), then are converted to digital signals by te A/D converter 22. Since, the change-over switch 23 and the field memories 9a, 9b, and 9c are controlled by the control circuit 13, the output of the solid state imaging device 8 in the field Fa is written into the field memory 9a, the output of the device 8 in the field Fb is written into the field memory 9b, and the output of the solid state imaging device 8 in the field Fc is written into the field memory 9c. In the field memory in which no signal has been written, a signal which has been written one frame before is read out. In consequence, the output is continuously obtained from each of the three field memories 9a, 9b, and 9c. These outputs from the field memories are converted into analog signals by the D/A converters 24a, 24b, and 24c, respectively, then are input to the analog multipliers 25, 26, and 27. The ROMs 31a, 31b, and 31c respectively contain the values expressed by:

$$S^2/(3S^2 - 3S + 1), (S - 1)S/(3S^2 - 3S + 1), \quad (3)$$

$$(S - 1)^2/(3S^2 - 3S + 1)$$

where S=n/m. While a value n is being output from the control circuit 13 in each field as 1, 2, 3, . . . m, the values expressed by the equation (3) are read out as digital values from the ROMs 31a, 31b, and 31c. These values are converted into analog values by the D/A converters 32a, 32b, and 32c, then are input to the multipliers 25, 26, and 27, respectively, at which they are multiplied by the video outputs of the respective fields. The outputs from the multipliers 25, 26, and 27 are added by the adders 28a, 28b, and 28c: the outputs of the multipliers 25 are added by the adder 28a, the outputs from the multipliers 26 are added by the adder 28b, and the outputs from the multipliers 27 are added by the adder 28c. Thus, the calculations expressed by the equations (2) are conducted so as to produce primary color signals R, G, and B which have no color mixture. These signals may be directly input to a RGB input color monitor. Alternatively, they may be converted to NTSC signals by an NTSC encoder, then are input to the color monitor so as to display a color image.

In the first embodiment, the object is kept illuminated because no period during which light illumination is suspended is provided. Therefore, the illumination period is long, i.e., the intensity of the light is large. This causes the level of the signal output from the solid state imaging device 8 to be increased, increasing the sensitivity. It also enables provision of a vivid color image which ensures excellent S/N ratio. These in turn enable the first embodiment to be suitably applied to an endoscope. Read-out of the signal can be performed at a lower frequency than that in a case in which scanning is performed in a period during which illumination is suspended. Even when the number of picture elements of the imaging device is increased, signals can be read out in a natural manner so as to provide an image of a high resolution. In the above description, the light is switched over into three R, G, and B primary colors. However, it may be switched over into complementary colors of cyan, magenta, and yellow or combinations of the primary and complementary colors. If more than three types of lights in which the three primary colors are mixed at different ratios are used, more than three field memories are employed to divide them into primary color signals.

In the above-described embodiment, the multiplication/addition operations by the matrix circuit are analog operations. However, they may also be digital operations. The coefficients of matrix are generated using the ROMs. However, they may be calculated using a digital or analog operation circuit. The signals which are output from the matrix circuit are R, G, and B primary color signals in the above-described embodiment. However, if the NTSC signal is to be used, they may be a luminance signal Y and color-difference signals R-Y, B-Y.

Figure 5:
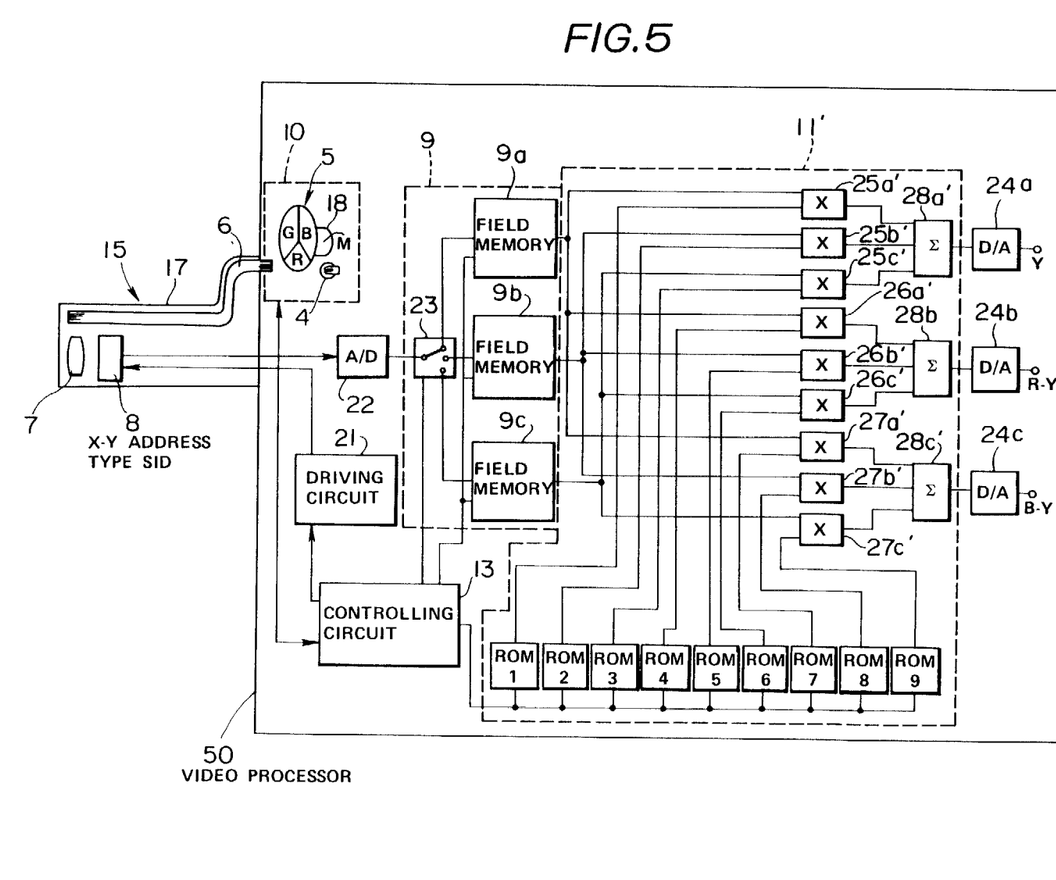
FIG. 5 illustrates the structure of a main part of a second embodiment of the present invention.

FIG. 5 shows the main part of a second embodiment of the present invention. In this embodiment, the matrix operations are digital, and a luminance signal Y and color-difference signals R-Y and B-Y are output as the result of matrix operations.

In FIG. 5, the digital signal outputs from the field memories 9a, 9b, and 9c are input to digital multipliers 25a', 26a', 27a'; 25b', 26b', 27b'; 25c', 26c', 27c' (these being simplified as 25', 26', 27'), and the outputs of the digital multipliers 25', 26', 27' are input to digital adders 28a', 28b', 28c'. This embodiment employs nine ROMs 1 to 9 which generate different coefficients. The coefficients contained in the ROMs 1 to 9 are expressed as follows:

ROM 1: $\qquad$ (4)

$$\frac{1}{3S^2 - 3S + 1}\{0.30S^2 + 0.59S(S - 1) + 0.11(S - 1)^2\}$$

ROM 2:

$$\frac{1}{3S^2 - 3S + 1}\{0.59S^2 + 0.11S(S - 1) + 0.30(S - 1)^2\}$$

ROM 3:

$$\frac{1}{3S^2 - 3S + 1}\{0.11S^2 + 0.30S(S - 1) + 0.59(S - 1)^2\}$$

ROM 4:

$$\frac{1}{3S^2 - 3S + 1}\{0.70S^2 - 0.59S(S - 1) - 0.11(S - 1)^2\}$$

ROM 5:

$$\frac{1}{3S^2 - 3S + 1}\{-0.59S^2 - 0.11S(S - 1) + 0.70(S - 1)^2\}$$

ROM 6:

$$\frac{1}{3S^2 - 3S + 1}\{-0.11S^2 + 0.70S(S - 1) - 0.59(S - 1)^2\}$$

ROM 7:

$$\frac{1}{3S^2 - 3S + 1}\{-0.30S^2 - 0.59S(S - 1) + 0.89(S - 1)^2\}$$

ROM 8:

$$\frac{1}{3S^2 - 3S + 1}\{-0.59S^2 + 0.89S(S - 1) - 0.30(S - 1)^2\}$$

ROM 9:

$$\frac{1}{3S^2 - 3S + 1}\{0.89S^2 - 0.30S(S - 1) - 0.59(S - 1)^2\}$$

where S=n/m.

A video signal is read out from the solid state imaging device 8 incorporated in the electronic scope 15 shown in FIG. 5 when a drive signal is applied thereto by the drive circuit 21. The video signal is then converted to a digital signal by the A/D converter 22 in the video processor 50, then is written into the corresponding field memory 9a, 9b or 9c by the operation of the control circuit 13. The output of the field memory 9a is input to the digital multipliers 25a', 26a', 27a', the output of the field memory 9b is input to the digital multipliers 25b', 26b', 27b', and the output of the field memory 9c is input to the digital multipliers 25c', 26c', 27c'.

The outputs of the ROMs 1 to 9 are input to the multipliers 25a', 25b', 25c', . . . 27c', respectively, while the value n is being input to the ROMs 1 to 9 by the control circuit 13 as 1, 2, 3, . . . , m, the values expressed by the equations (4) are output from the ROMs to the multipliers 25a', 25b', . . . , 27c', at which they are multiplied by the video output of each field. The outputs of the multipliers $25a'$, $25b'$, ..., $27c'$ are added by the adders $28a'$, $28b'$, $28c'$. As a result, a luminance signal and color-difference signals having no color mixture and which are determined by the following expressions (5) are produced in a digital value:

$$Y = 0.30R + 0.59G + 0.11B$$
$$R - Y = 0.70R - 0.59G - 0.11B \quad (5)$$
$$B - Y = -0.30R - 0.59G + 0.89B$$

These signals are then converted to analog signals by the D/A converters $24a$, $24b$, $24c$. Subsequently, they are input to an encoder to produce an NTSC video signal. If the matrix circuit $11'$ is of digital type as in this embodiment, it is possible to easily fabricate the circuit into an IC chip.

In this embodiment, the light source 10 is incorporated in a video processor 50. However, the light source 10 and the video processor 50 may be separate units, as in the first embodiment.

In either of the above-described embodiments, the period of each field is equal. However, it may be varied by the light illuminated in a field. Since the sensitivity to blue light is in general lower in a solid state imaging device, it is advantageous from the viewpoint of designing of the device if the period during which blue light is irradiated is made longer than that of other lights so as to compensate for it. A third embodiment which is to be described below is based on this concept.

Figure 6:
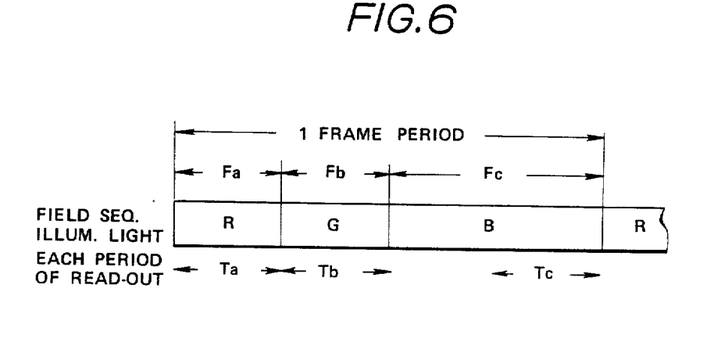
FIG. 6 illustrates the illumination period and the reading timing adopted in a third embodiment of the present invention.

FIG. 6 shows the timings at which the light illuminations and the read-out of the imaging device are performed. In this example, the time during which blue light (B) is irradiated is twice those of red (R) and green (G). Therefore, the period of field Fc is twice those of Fa and Fb. In this case, if the scanning frequency of the imaging device in Fc is set to one half of those of Fa and Fb, scanning can be started in Fc by the solid state imaging device at the time at which Fc begins, and be finished at the time at which Fc is ended. In that case, the equations (2) are used to express the primary color signals, as in the previous embodiments. However, it is not preferable for the scanning frequency of the solid state imaging device to be varied for each field, since it makes a scanning circuit complicated. Therefore, in the example shown in FIG. 6, scanning in Fc by the device is delayed by one half of the period thereof, scanning in Fc being completed at the time at which the field Fc is ended by the use of the same frequency as those used in Fa and Fb. The signals $F_1$, $F_2$, $F_3$ which are respectively read out in the fields Fa, Fb, and Fc are expressed by the following equations:

$$F_1 = SR + \frac{1-S}{2}B$$
$$F_2 = SG + (1-S)R \quad (6)$$
$$F_3 = \frac{1+S}{2}B + (1-S)G$$

The components of the primary colors are obtained from the following equations (6):

$$R = \frac{1}{4S^2 - 3S + 1}\{S(S+1)F_1 + (S-1)^2F_2 + S(S-1)F_3\} \quad (7)$$

$$G = \frac{1}{4S^2 - 3S + 1}\{(S^2-1)F_1 + S(S+1)F_2 + (S-1)^2F_3\}$$

$$B = \frac{1}{4S^2 - 3S + 1}\{(S-1)^2F_1 + S(S-1)F_2 + S^2F_3\}$$

Figure 7:
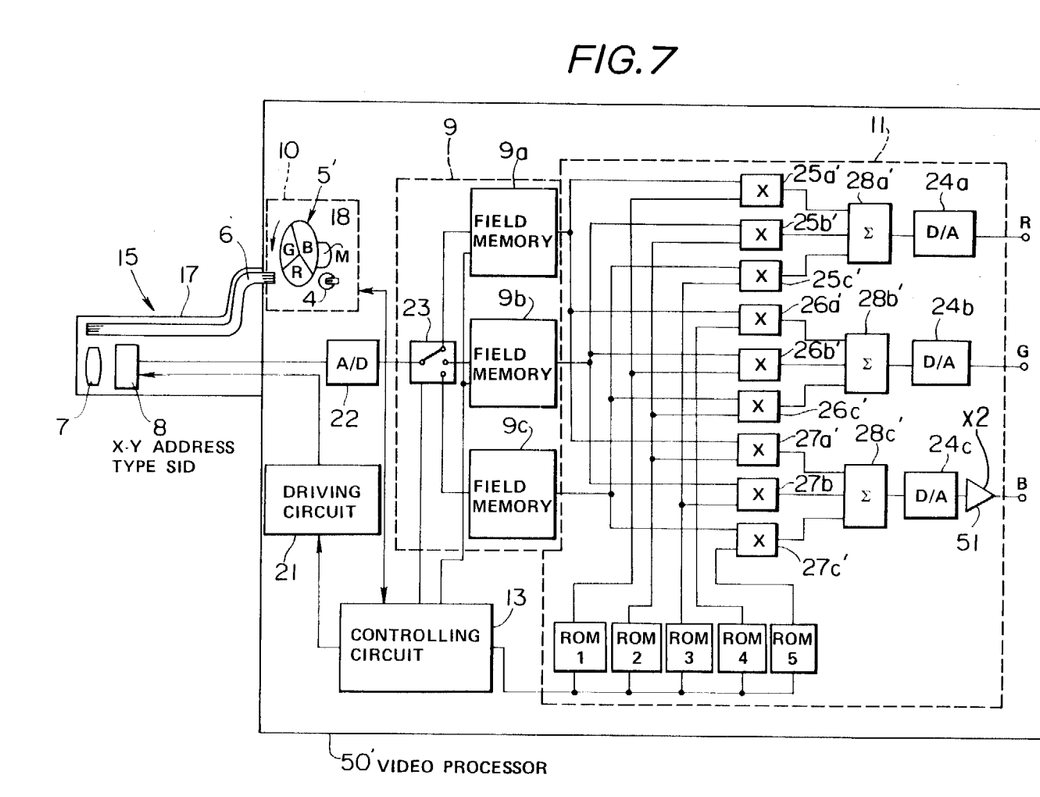
FIG. 7 illustrates the structure of a main part of the third embodiment of the present invention.

Primary color components from which color mixture is eliminated can be obtained by the calculations based on the equations (7). FIG. 7 is a diagram of a circuit which digitally performs these calculations so as to produce R, G, B outputs. In FIG. 7, ROMs 1 to 5 incorporated within a video processor $50'$ contain the following values:

$$ROM\ 1: \frac{S(S+1)}{4S^2 - 3S + 1} \quad (8)$$

$$ROM\ 2: \frac{(S-1)^2}{4S^2 - 3S + 1}$$

$$ROM\ 3: \frac{S(S-1)}{4S^2 - 3S + 1}$$

$$ROM\ 4: \frac{S^2-1}{4S^2 - 3S + 1}$$

$$ROM\ 5: \frac{S^2}{4S^2 - 3S + 1}$$

where $S = n/m$.

The output signal from the D/A converter $24c$ is input to an amplifier 51 which is an analog amplifier of gain 2.

In this embodiment, the length of the blue transmitting filter of a rotary filter $5'$ in the rotational direction is set to twice that of red or green transmitting filter.

The other structure of this embodiment is the same as that shown in FIG. 5, and description of the detailed structure thereof is therefore omitted. Next, the operation of this embodiment is described below with reference to FIG. 7. The output of the solid state imaging device 8 is written into the corresponding field memory $9a$, $9b$ or $9c$, as in the previous embodiment. The outputs of the field memories are input to the multipliers $25'$, $26'$, $27'$, respectively. The output of the ROM 1 is input to the multipliers $25a'$ and $26b'$; the output of the ROM 2 is input to the multipliers $25b'$, $26c'$, $27a'$; the output of the ROM 3 is input to the multipliers $25c'$ and $27b'$; the output of the ROM 4 is input to the multiplier $26a'$; and the output of the ROM 5 is input to the multiplier $27c'$. While the value n is being input by the control circuit 13 to the ROMs 1 to 5 as 1, 2, 3, ... m, the values expressed by the equations (8) are output from the ROMs to the multipliers $25'$, $26'$, $27'$ at which they are multiplied by the outputs of the field memories. The outputs of the multipliers $25'$, $26'$, $27'$ are added by the adders $28a'$, $28b'$, $28c'$, respectively. The outputs of the adders $28a'$, $28b'$, $28c'$ are respectively input to the D/A converters $24a$, $24b$, $24c$ at which they are converted to analog signals. The output of the D/A converter $24c$ is doubled by the amplifier 51. Thus, the calculations expressed by the equations (7) are completed, producing R, G, B primary color signals. The present invention can be applied to a case in which the times during which the lights are irradiated are not constant by setting the coefficients of the matrix to suitable values in the manner described above.

Figure 8:
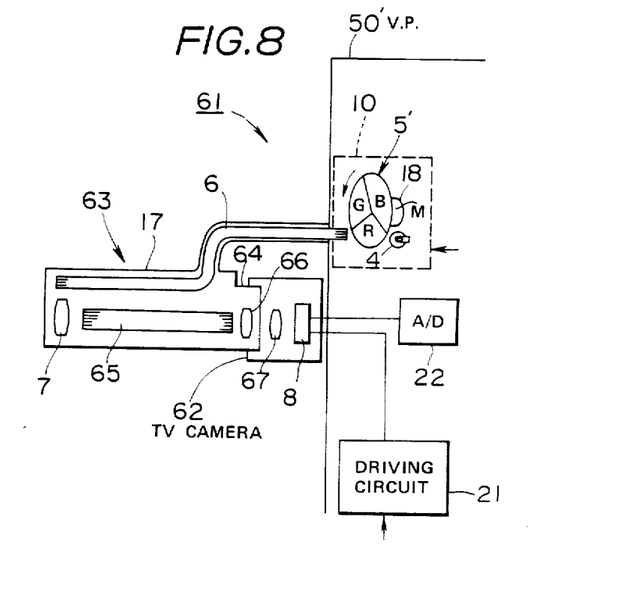
FIG. 8 illustrates the structure of part of an endoscope incorporating a TV camera including the X-Y addressed solid state imaging device and provided at an eyepiece section of a fiber scope.

FIG. 8 shows part of an endoscope apparatus 61 incorporating the third embodiment of the present invention.

In this apparatus 61, the field sequential imaging means is incorporated in a TV camera 62 which is mounted on an ocular section 64 of a fiberscope 63.

The fiberscope 63 incorporates an image guide 65 which ensures that the solid state imaging device 8 is located at the incident side, and an eyepiece 66 which is disposed in such a manner that it faces the end of the image guide 65 from which the light is emitted. Other structure of the fiberscope is the same as that of the electronic scope 15, these components being indicated by using the same reference numbers.

In the TV camera 62 mounted on the ocular section 64, an imaging forming lens 67 is disposed in such a manner that it faces the eyepiece 66. The X-Y addressed solid state imaging device 8 is disposed at a position at which an image is formed by the eyepiece 66 and the image forming lens 67. The output signal from the solid state imaging device 8 is input to the video processor 50' shown in FIG. 7. Lights are supplied to the light guide 6 of the fiberscope 63 from the light source device 10 in a field sequential manner.

The operation of this embodiment is the same as that of the third embodiment shown in FIG. 7.

As will be understood from the foregoing description, it is possible to correct color mixture which occurs owing to lag in the exposure period as the imaging screen is scanned when an X-Y addressed solid state imaging device is used in the field sequential color imaging apparatus, according to the present invention. In consequence, it is possible to ensure a highly efficient use of light and a high sensitivity without suspending light illumination during the scanning.

Luminance light may be output from the field sequential illumination system in place of the three red, green and blue primary color lights or complementary color lights. Combinations of these lights may also be produced by the illumination system.

Different embodiments may be constructed by combining parts of the above-described embodiments.

What is claimed is:

1. A field sequential color imaging apparatus comprising:
    a field sequential illumination means for illuminating an object by light having different wavelengths for each of several fields;
    an imaging means comprised of an image forming lens for forming an image of said object, and an X-Y addressed solid state imaging device disposed in the focal plane of said image forming lens;
    a solid state imaging device drive means for applying a drive signal to said X-Y addressed solid state imaging device for each of said fields so as to allow a signal which has been photoelectrically converted by said solid state imaging device to be read out;
    a memory means comprised of field memories for temporarily storing signals of corresponding fields which have been read out from said solid state imaging device; and
    a matrix means for performing on a plurality of signals read out from said memory means a weighting which accounts for the timing at which said signals were read out from said solid state imaging device and for adding the weighted results so as to produce predetermined color video signals.

2. A field sequential color imaging apparatus according to claim 1, wherein said matrix means is composed of circuits for generating weighting coefficients which are determined by the timing at which picture elements in said solid state imaging device are read out and which are therefore different for each picture element, a plurality of multipliers for multiplying signals which have been read out from said memory means by said weighting coefficients, and a plurality of adders for adding outputs of said multipliers.

3. A field sequential color imaging apparatus according to either of claims 1 and 2, wherein said matrix means is an analog system which processes analog values.

4. A field sequential color imaging apparatus according to either of claims 1 and 2, wherein said matrix means is a digital system which processes digital values.

5. A field sequential color imaging apparatus according to claim 2, wherein said weighting coefficient generating circuits are formed of read only memories.

6. A field sequential color imaging apparatus according to claim 1, wherein said illumination means outputs three red, green, and blue primary colors in succession.

7. A field sequential color imaging apparatus according to claim 1, wherein said illumination means is composed of a lamp for generating white light, a rotary filter disposed in an optical path of said white light and having fan-shaped red, green, and blue light transmitting filters which are disposed in the circumferential direction of said rotary filter, and a motor for driving said rotary filter.

8. A field sequential color imaging apparatus according to claim 1, wherein said X-Y addressed solid state imaging device is a MOS type solid state imaging device.

9. A field sequential color imaging apparatus according to claim 1, wherein said X-Y addressed solid state imaging device is a charge modulation device.

10. A field sequential color imaging apparatus according to claim 1, wherein said imaging means is provided within an electronic scope having an elongated insertion portion.

11. A field sequential color imaging apparatus according to claim 1, wherein said imaging means is incorporated in a TV camera.

12. A field sequential color imaging apparatus according to claim 11, wherein said TV camera can be mounted on an ocular portion of a fiberscope.

* * * * *